United States Patent
Grosman (10) Patent No.: US 11,348,157 B1
(45) Date of Patent: May 31, 2022

(54) REPLENISHMENT RECEPTACLE (CONNECTED CONSUMER PACKAGED GOODS) FOR A CONSUMPTION AND REPLENISHMENT SYSTEM AND PROCESS

(71) Applicant: Rotem Grosman, Plantation, FL (US)

(72) Inventor: Rotem Grosman, Plantation, FL (US)

(73) Assignee: WEPLENISH, LLC, Plantation, FL (US)

(*) Notice: Subject to any disclaimer, the term of this patent is extended or adjusted under 35 U.S.C. 154(b) by 893 days.

(21) Appl. No.: 15/623,955

(22) Filed: Jun. 15, 2017

Related U.S. Application Data (60) Provisional application No. 62/516,699, filed on Jun. 8, 2017, provisional application No. 62/467,338, filed on Mar. 6, 2017, provisional application No. 62/365,578, filed on Jul. 22, 2016, provisional application No. 62/354,297, filed on Jun. 24, 2016.

(51) Int. Cl.
| | |
|---|---|
| *G06Q 30/00* | (2012.01) |
| *G06Q 30/06* | (2012.01) |
| *G01F 17/00* | (2006.01) |
| H04L 67/306 | (2022.01) |
| G06Q 10/08 | (2012.01) |
| H04W 4/70 | (2018.01) |

(52) U.S. Cl.
CPC ......... *G06Q 30/0635* (2013.01); *G01F 17/00* (2013.01); *G06Q 10/083* (2013.01); *H04L 67/306* (2013.01); *H04W 4/70* (2018.02)

(58) Field of Classification Search
CPC .............................. G01F 17/00; H04L 67/306
See application file for complete search history.

(56) References Cited

U.S. PATENT DOCUMENTS

| | | | |
|---|---|---|---|
| 8,926,262 B2* | 1/2015 | Tanahashi | F01D 5/282 |
| | | | 415/9 |
| 2002/0161652 A1* | 10/2002 | Paullin | B65D 79/00 |
| | | | 705/22 |

(Continued)

OTHER PUBLICATIONS

Hsu, C.F., Smart Pantries for Homes, Oct. 1, 2006, 2006 IEEE International Conference on Systems, Man, and Cybernetics, vol. 5, pp. 4276-4283 (Year: 2006).*

*Primary Examiner* — Michael Misiaszek
*Assistant Examiner* — Timothy J Kang
(74) *Attorney, Agent, or Firm* — CRGO Global; Steven M. Greenberg (57) ABSTRACT

A replenishment receptacle comprised of a volumetric region for storing a consumable good during shipping to a consumer location, a processor, a transceiver, programmatic instructions stored in a non-transitory storage medium, an a sensor for determining a quantity of the consumable good in the volumetric region. The sensor periodically detects and reports changes in the quantity of the consumable good present the volumetric region. When the quantity is low (below an established threshold), the consumer good is automatically reordered from a vender, purchased, and shipped to a consumer location. In embodiments, a rate of consumption of the consumable good affects when automatic reordering occurs to ensure the consumable good does not run-out before a new quantity arrives at the consumer location. The replenishment receptacle is able to be discarded in embodiments, where in others it is reusable and/or partially recyclable.

5 Claims, 3 Drawing Sheets (56) References Cited

U.S. PATENT DOCUMENTS

| | | | |
|---|---|---|---|
| 2004/0149896 A1* | 8/2004 | Seethaler | G01F 23/2921 |
| | | | 250/223 B |
| 2010/0102959 A1* | 4/2010 | Ashrafzadeh | G06Q 10/087 |
| | | | 340/540 |
| 2017/0278176 A1* | 9/2017 | Valkov | B65B 35/10 |

* cited by examiner

REPLENISHMENT RECEPTACLE (CONNECTED CONSUMER PACKAGED GOODS) FOR A CONSUMPTION AND REPLENISHMENT SYSTEM AND PROCESS

CROSS-REFERENCE TO RELATED APPLICATIONS

This is a utility application that converts the following U.S. Provisional Applications: 62/354,297 filed Jun. 24, 2016 titled "Consumption Device and Reodering Network for Consumption Device"; 62/365,578 filed 07, 22, 2016 titled "Repurchase Order Optimization for a Consumption Device"; 62/467,338 filed Mar. 6, 2017 titled Leveraging Consumer Relationships for Consumption Device Repurchases; and 62/516,699 filed Jun. 8, 2017 titled "A Replenishment Receptacle (Connected Consumer Packaged Goods) for a Consumption and Replenishment System and Process."

The entire contents of each and every one of the above provisional applications are incorporated by reference herein in their entirety.

BACKGROUND

The present invention relates to the field of smart containers, and more particularly, to a replenishment receptacle (connected consumer packaged goods or cCPG) for a consumption and replenishment system.

As the availability of online ordering, shopping services, and home delivery of consumable products, such as food, detergents, and beverages, rises, many consumers are moving away from shopping at brick-and-mortar stores/marketplaces. Online ordering and shopping services allow the consumer to shop without having to be physically present within the store; allowing the consumer to shop during free time or after the regular business hours of a brick-and-mortar store.

As such, consumers are bombarded with a variety of online marketplaces/stores and/or services when shopping for consumables. If home delivery is desired, then the consumer must further evaluate how the shipping expense impacts the overall value and benefit. This leaves the consumer with an astronomical amount of options to consider, resulting in many consumers choosing a popular store or service even if it is not the best value for their purchase.

What is needed is a way to bypass the complications of continuously purchasing consumer good purchases, especially in the case of consumables which are replenished as consumed.

DETAILED DESCRIPTION

Embodiments of the disclosure focus upon Connected Consumer Packaged Goods (cCPGs) in which the packages themselves (of the cCPGs) include sensors for measuring contents. The cCPGs facilitate automated reordering of the products, when supplies (internally monitored) are running low. Consumers of cCPGs for replenishables are able to ensure constant reordering of recurrent products, without fuss. The packaging of a cCPG detects when supplies run low, and can trigger a re-order over a network. In one embodiment, an end-user can leave the expended cCPG outside for pickup by the delivery personnel when a new delivery is made. In embodiments, the cCPG includes an internal power supply, a sensor array, a network transceiver (e.g., BLUTOOTH, WIFI, LTE, 3G, 4G, etc.). When local networks (personal area network transceivers) are equipped in the cCPG, an in-home communication hub (capable to reading the local signals and connecting to the internet) receives messages from the cCPG and forwards these messages to a network location, or an LTE network receives these messages directly. In another embodiment, communications between the cCPG and a network location occurs by using a mobile phone as a communication intermediary. The cCPG may be an internet of things enabled package, which communicates and exchanges information to other connected devices in a geographic region. For example, the cCPG can be compatible with SAMSUNG SMART THINGS and related hubs in one embodiment. When cCPGs are deployed, no configuration or complicated setup processes are necessary. A consumer can simply consume contents within a cCPG (per normal consumption patterns), which results in the cCPG automatically replenishing itself. No smartphone application, e-commerce ordering, or other consumer directed interaction is necessary. Instead, a subscription service may be inherently implemented on any cCPG provided good, which enables a user to subscribe to the replenishment service. The subscription service may be triggered upon an initial purchase of a cCPG good, for example; such that an initial ordering of the good includes an agreement for the subscription to keep that specific good stocked/replenished. Unlike conventional subscription and replenishment services, which are based on time-based replenishment cycles, the CPG replenishment scheduling is measurement based and conforms to end-user consumption patterns.

In one embodiment, the CPG packaging can be preferred by a manufacturer of a good. Ordering and replenishment can occur directly between a manufacturer and an end-consumer. For example, a consumer may go to a CPG providing site (e.g., WePlenish.com or other such Web site) and order a specific good with CPG packaging. The subscription for replenishment is activated by checking a "keep-it-coming" or "Never Run Out" checkbox. Anytime a user wishes to end the subscription, a selection to terminate the auto-replenishment can be made from the same Web site (upon which orders were placed). Alternatively, a localized option may exist that is part of the CPG container itself, which includes a pull-tab for an "op-out" of the subscription. When such a pull-tab (or other input sensing means, such as a removal of an RFID sticker) occurs, the subscription stops automatically. Thus, no Web-site or smart application is necessary in embodiments; both are bypassed by the CPG itself. Further, intermediate retail stores are also bypassed in one embodiment, which saves the manufacturer (and consumer) significant amounts (as typical markup from retail stores on goods is approximately 30 percent). In the end, the CPG technology enables an automated replenishment of often used consumables, encourages consumer loyalty, and provides significant savings to manufacturers and end-users alike (while triggering "effortless" shopping and resupply).

Although the cCPG is a 'stand-alone' concept and provides for direct reordering of goods, the cCPG technology is compatible with other consumption based technologies. For example, if a consumption tracking device is used within a household, which measures consumption patterns, an overall (net) amount of goods on hand can be calculated based on quantities of a good in the consumption device plus quantities of a good present at a location within a set of cCPG(s). Consumption rates, delivery times, and other factors can be tracked at a server to ensure end-users are replenished (goods delivered to a house or office location, or any other location where consumption of the goods occurs) before that specific good runs out. cCPG and consumption device backend systems can be shared in various embodiments as well. Effectively, the cCPG is an evolution of a consumption container, where the cCPG includes the necessary electronics in a low-cost package (were costs of the electronics is offset by gains in efficient ordering with fewer mid-level retailers; thus, the mid-level retailer markup that is avoided offsets the increased costs for implementing electronics in the cCPG with further benefits of consumer convenience). References to a consumption container appearing within companion provisional applications referenced in the cross referenced section along with the instant provisional are able to be replaced/supplanted with a cCPG, per contemplated aspects of the disclosure.

In one embodiment, a cCPG can be a disposable shipping container that includes inexpensive internal electronics in a relatively low-cost packaging. A cCPG may be standardized to maximize recycling of materials. A typical "recycling bin" may be used to dispose of cCPG discards, which are reclaimable (at least in part), at a recycling center. Thus, a cCPG container is intentionally "minimized" to minimize cost, while being sturdy enough, and low cost enough for safely shipping and storing consumables. Various plastic packages with embedded electronics, which can be installed during container fabrication printed or formed inside a container itself, may be used. For example, additive manufacturing processes (AKA 3D printing or direct write) is able to print commercially available conductive dielectric semiconductors into a variety of 2D and 3D plastic, ceramic, and metallic substrates. This process will allow electrical components to be connected with minimal materials. Other low cost circuit manufacturing technologies can be utilized herein to similar effect.

In another embodiment, the cCPGs used may be collected at the time of a new delivery, much like glass soda bottles or milk bottles of old were re-used and redelivered. In such embodiments, deposits and redemption amounts for the cCPGs can be integrated into the financials. In locations were theft is a significant concern, the cCPG can be equipped with securing mechanisms and locks (accessible by a home-owner and a delivery agent) to ensure that contents of the cCPG are secured and that any recoverable components of a cCPG are theft resistant.

One embodiment of the disclosure is for a consumption system including a network-enabled replenishment receptacle, a remotely-located consumption server, and a network-enabled consumption device. The network-enabled replenishment receptacle includes a wireless transceiver, a sensor, a processor, and a power source, said network-enabled replenishment receptacle having a volumetric region for a consumable product. The network-enabled replenishment receptacle is shipped to a consumer delivery location specified by a consumer. The processor triggers the sensor to measure quantities of consumer goods contained in the volumetric region and to convey a message of the measured quantities via the wireless transceiver. The remotely-located consumption server is configured to, upon the replenishment receptacle having reached a predefined volumetric region threshold such that the measured quantities is less than the predefined volumetric region threshold, effectuate an automatic repurchasing of the consumable product from a vendor for delivery to the consumer delivery location. The network-enabled consumption device has a device volumetric region for storing a consumable product and a means for determining a relative level of volume empty versus not empty within the device volumetric region. A consumer is associated with the consumption device. A second predefined volumetric region threshold is compared against a sum of the volume determined from the device volumetric region and a volume present in the replenishment receptacle. When the sum is less than the second predefined volumetric region threshold, an automatic repurchasing of the consumable product from a vendor for delivery to the consumer delivery location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
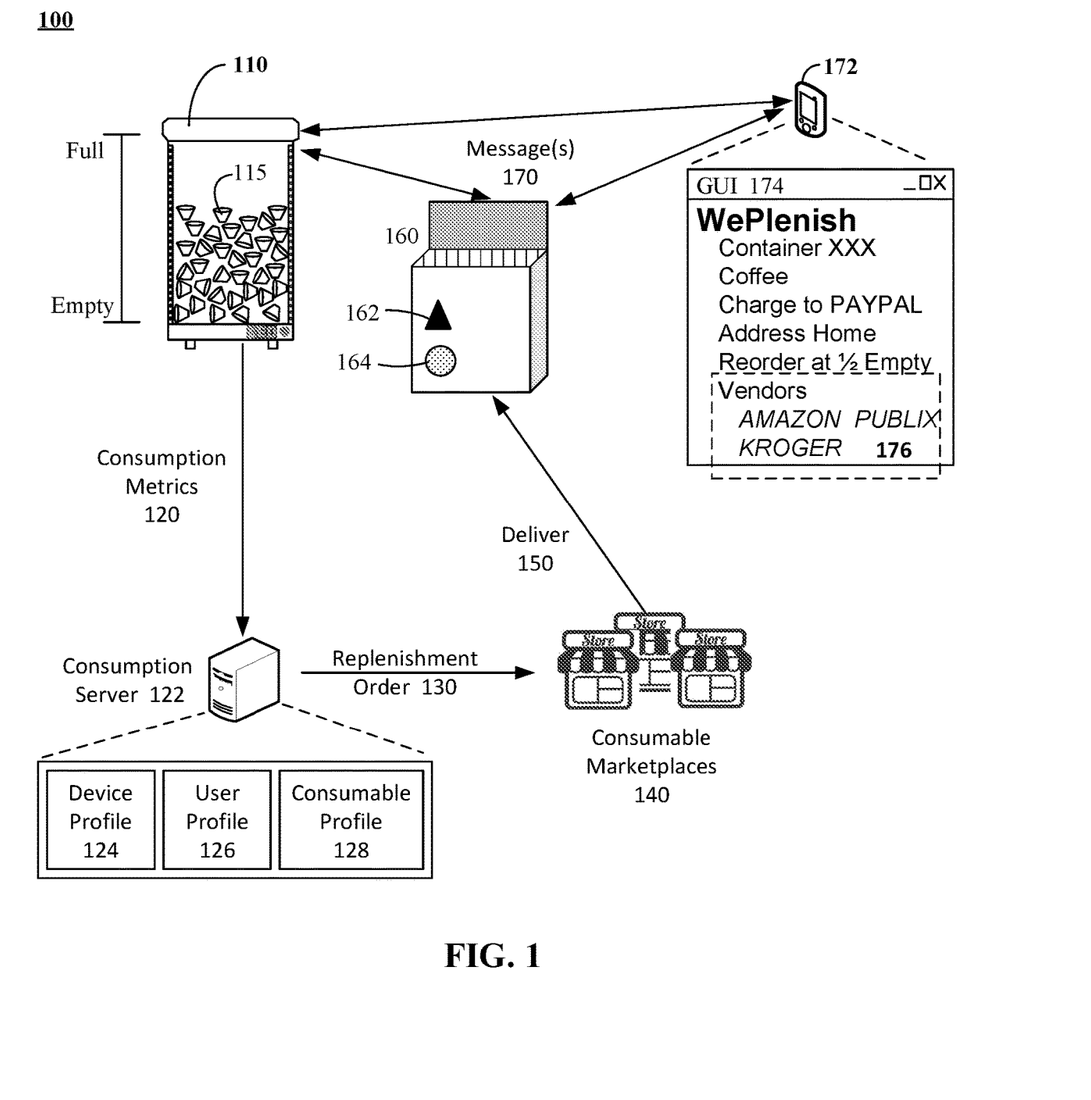
FIG. 1 shows a replenishment receptacle that is a measurement enabled container for consumer goods.

Turning to FIG. 1, a replenishment receptacle 160 (which is otherwise referred to as a Connected Consumer Packaged Good or cCPG) is a measurement enabled (sensor laden) container for consumer goods. The replenishment receptacle 160 may be disposable and inexpensive with optional recyclable components, or may be a more durable container that is designed for re-use. The disposability of the receptacle 160 is somewhat dependent on the goods being shipped within, the cost of the goods, and the packaging requirements to ensure safe delivery. The replenishment receptacle 160 can have a variety of shapes and/or configurations. A transceiver 162 and a sensor 164 can be installed within the replenishment receptacle 160.

The transceiver 166 can allow the replenishment receptacle 160 to exchange messages 170 with a remote server, hub, or intermediate communication device (such as a mobile phone). The hub can be a home network system designed to be plugged into an outlet near a delivery and/or storage location. For example, the transceiver 162 may be a low-power transceiver able to communicate short range (100 meters or less) to the hub, which is connected to an internet backbone. In another embodiment, the replenishment receptacle (160) itself may have a long-range transceiver (e.g., a 3G circuit) in which case a local hub or other communication intermediary device is unnecessary. The messages 170 occur periodically and convey a current status or "fill" or "volume" of included goods (e.g., consumption metrics) to a remote server. The server (e.g., consumption server 122), upon receiving the messages 170 can trigger re-ordering and replenishment actions automatically. This reordering is part of a subscription service in one embodiment and no manual effort/engagement is needed. In another embodiment, user-facing supply interfaces (available via a Web site or an application running on a computer or smart-phone as shown by GUI 174) are provided to adjust resupply parameters. Users may opt for a "man-in-the-loop" option, in which case instead of re-orders occurring transparently and automatically, messages are presented via a control device (e.g., device 172) to confirm (and provide payment for) replenishable goods. Advertisements and good-specific deals relating to consumption levels are also contemplated as being within scope of embodiments of the innovation.

Further, although in one embodiment, the replenishment receptacles 160 (e.g., cCPG) is provided direct from a manufacturer to a consumer, other embodiments are contemplated. For example, local stores (brick and mortar stores, supply warehouses, third party service(s), and other consumable marketplaces 140 can "compete" to resupply replenishment receptacles 160. In such cases, the consumption server 122 tracks location, consumption patterns, and user-need. This information can be correlated with local suppliers (and non-local ones) in order to competitively bid a "resupply" cycle. For example, if in a given area ten thousand home users of replenishment receptacles for "strawberries" exist, local marketplaces and produce centers can "bid" (with the consumption server 122) to provide a replenishment cycle. This bidding process can be transparent to end-users, but can leverage quantity to achieve volume-based discounting. Feedback loops, indemnification clauses, and other quality assurance measures are able to be injected into the process to ensure high-quality goods are provided to end-users via the replenishment receptacles 160, in embodiments.

It should be appreciated, however, that use of the sensor laden replenishment receptacle 160 is independent (and is a direct replacement for) a consumption container 110 (as expressed herein an in companion cases), in embodiments. Thus, any reference to a consumption container 110 is able to be replaced with a replenishment receptacle 160 in contemplated embodiments without varying from the intended scope of the disclosure. In other embodiments, one or more additional devices, such as consumption device 110, are able to interact with the replenishment receptacle 160. Thus, the replenishment receptacle 160 is a key component of a technological system for consumer good monitoring and replenishment in embodiments.

To elaborate, FIG. 1 shows a consumption device 110 that contains a quantity of a consumable product 115. The included consumable product 115 is consumed over time, which changes the relative volume of the consumable product 115 within the consumption device 110 (and/or receptacle 160). As used herein, the terms "consumables" and "consumable products" can be used interchangeably to refer to the items contained within the consumption device 110 (and/or receptacle 160).

In one embodiment, the consumption device 110 can be a storage container having a lid. In one embodiment, the consumption device 110 can have content preserving characteristics, such as being vacuum-sealed, refrigerated, frozen, insulating, and the like. The consumption device 110, in embodiments, can be self-dispensing, where a quantity of consumable is conveyed through a dispenser mechanism.

The consumption device 110 may be designed for a kitchen, garage, pet, livestock, living room, office, or other such location. The consumption device 110 can be designed to store solid objects, liquids, and even sealed gasses in various embodiments contemplated herein. In one embodiment, a "generic" container can be produced having a volumetric region for storing loose solid objects. The consumption device 110 (and/or receptacle 160) can be designed with an included sensor set present at the time of manufacture or can be an otherwise standard container retrofitted for detecting volumetric changes. Consumption device 110 (and/or receptacle 160) specifics can be contemplated as varying depending on the consumable products that it is designed to store.

The consumption device 110 (and/or receptacle 160) can include at least one sensor, which measures a volume of a consumable product 115 contained within, which is shown in FIG. 1 as being within a range of full to empty. The consumption device 110 (and/or receptacle 160) can be communicatively linked to a consumption server 122, either directly or through a communication intermediary. Over this linkage, the consumption device 110 (and/or receptacle 160) can convey consumption metrics 120 and/or other data. In some embodiments, the consumption device 110 (and/or receptacle 160) can receive queries, requests, and other data from the consumption server 122 over this communication linkage.

The consumption server 122, after receiving the consumption metrics 120, can track changes in volumetric levels of the consumption device 110 over time. Using this information, a rate of consumption per time can be calculated. This rate can be used to predict a time that the consumable product 115 within the consumption device 110 (and/or receptacle 160) will be exhausted. The consumption server 122 can also compute a shipping time from various sources to provide the consumable product 115 to the suitable address (e.g., address home established via graphical user interface (GUI) 174). Different costs can be associated with a time requirement of the shipping as well as the specific method of shipping. The consumption server 122 can be configured to optimize fulfillment of consumable products 115 from an economic perspective.

In one embodiment, a user can communicate with the consumption server 122 using a GUI 174 on a remote device 172. The GUI 174 can be written to work within an existing framework, such as a web browser (not shown), or as part of a stand-alone mobile application. Information provided via the metrics 120 and the GUI 174 can be used to establish a device profile 124, a user profile 126, and a consumable profile 128, which is persisted and programmatically used by the consumption server 122.

The device profile 124 can store data values for a relative volume of storage, a storage type, a quantity of sensors, a unique ID, a communication protocol, overall capabilities, and the like of the consumption device (also referred to as consumption container 110—a 'normal' container can be retrofitted with hardware for tracking and reporting volumetric changes to function as a consumption device, which is one reason for the difference in terminology used herein).

The user profile 126 can provide information specific to a set of one or more users registered with the consumption container 110 (and/or receptacle 160). One user/group can register multiple containers and information need not be repeated once a profile is established. In addition to basic user information, such as name, communication device, address, and billing information, the user profile 126 can also contain user-specified vendors 176 like those shown in GUI 174.

The vendors 166 can represent data about the online consumable marketplaces 140 that the consumption server 122 should interact with when repurchasing the consumable product 115. The user can have an existing consumer relationship with the vendors 176, such as a membership or a loyalty points. The consumption server 122 can be configured to utilize each of the listed vendors 176 as well as a pool of other trusted consumable marketplaces 140 when generating the replenishment order 130.

The consumable profile 128 can include information specific to the consumable products 115 used with the consumption container 110 (and/or receptacle 160). The consumable profile 128 can specify a single consumable product 115 by brand, volume, and/or type in one embodiment. In other embodiments, some flexibility can be established for a consumable 115, where the consumable profile 128 can indicate a level of flexibility with regard to brand, type, flavor, size, color, and/or other characteristics of the consumable products 115.

In some embodiments, the consumable container 110 (and/or receptacle 160) can be segmented to allow for different types to be filled/stored/dispensed. In such embodiments, each segmented compartment can be individually addressed within the consumable profile 128. In one embodiment, different price preferences can be established for the consumable products 115 within the profile 128.

In another embodiment, instead of explicit profiles 124, 126, and 128, a general account can be established by the consumption server 122 on a per user/device basis. The account can store data similar to that of the profiles 124, 126, and 128.

The remote device 172 can exchange messages 170 with the consumption container 110, the replenishment receptacle 160, and/or the consumption server 122. In one embodiment, for example, the consumption server 122 may convey a message 170 to the user of device 172 to approve repurchasing of the consumable product 115, which results in a user being charged for the replenishment. In other embodiments, the replenishment is automatic. In one embodiment, an application running on device 172 can query the status of any consumption container 110 and/or replenishment receptacle 160 to determine its current status.

The consumption server 122 can submit a replenishment order 130 or set of replenishment orders 130 to one or more consumable marketplaces 140. The marketplace(s) 140 can be any source of a desired consumable product 115. The marketplace may represent a local store, an online store, a warehouse including repurchased consumable products, a direct manufacturing source, and the like. Processing of the replenishment order 130 by the consumable marketplace 140 can result in the consumable products 115 being shipped and/or delivered 150 to the user's replenishment receptacle 160 at a provided address.

In another embodiment, various marketplaces 140 can "bid" on fulfillment of the replenishment order 130. That is, the replenishment order 130 can be sent to multiple marketplaces 140 knowing that they are competing against their direct competitors to fulfill the order 130. Selection of the marketplace 140 to fulfill the replenishment order 140 can be based upon a variety of parameters including, but not limited to, cost, user preference, shipping date, delivery service, and the like.

Further, multiple marketplaces 140 can be selected to fulfill the replenishment order 130. For example, a single marketplace 140 may not have enough inventory on hand to provide the desired amount or variety of the ordered consumable 115.

Further, the consumption server 122 may benefit from volume purchases (for multiple consumption containers 110 and/or receptacles 160)), where the discount can be used to offset the costs of providing the consumption container 110/receptacle 160 service(s), and/or can be obtained for an increased profit margin.

In one embodiment, relationships can be established with a brick-and-mortar storefront (local to the user and the container 110 and/or receptacle 160) to allow/facilitate expressed delivery of consumable products 115 at need. Because consumption patterns are determined by the server 122, a level of granularity for tracking (receipt of the consumption metrics 120) and predicting consumer-level need is possible, which is normally not.

Figure 2:
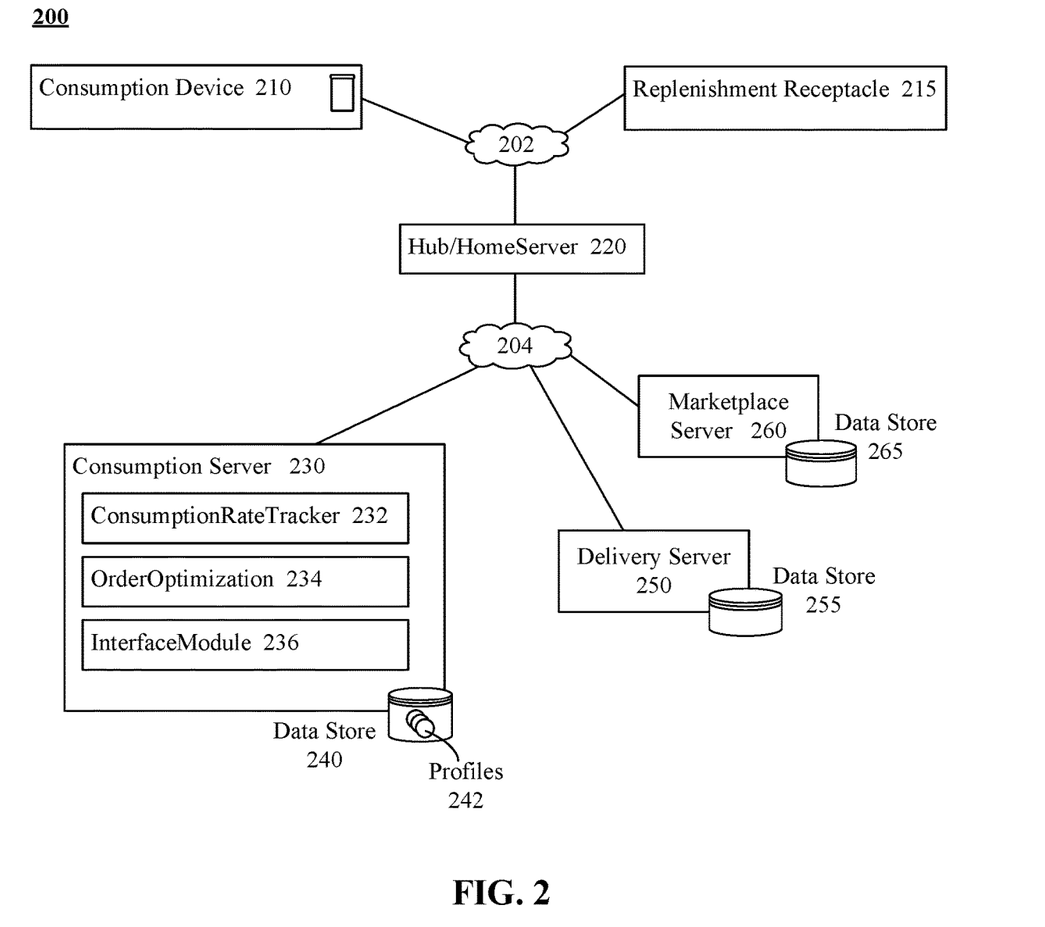
FIG. 2 shows a block diagram of a system using a consumption device and a replenishment receptacle.

FIG. 2 shows a block diagram of a system 200 using the consumption device 210 and the replenishment receptacle 215. In system 200, the consumption device 210 can connect to a local hub and/or home server 220 via a personal area network 202 (i.e., a network comprised of consumption devices 210 and replenishment receptacles 215), which in turn connects to a broader network 204 like the Internet or a cellular network. Additionally or alternatively, the consumption device 210 and/or the replenishment receptacle 215 can directly connect to network 204, to which consumption server 230, marketplace server 260, and/or delivery server 250 are also connected. In this manner, information can be exchanged between these elements, which are remotely located from each other.

Consumption server 230 (described in FIG. 1 as consumption server 122) is a server comprising hardware and software. The hardware can include one or more processors, circuitry, transceivers, user interface, data storage units, and the like. Server 230 can be a dedicated machine and/or can be a virtual machine implemented on top of a platform. The consumption server 230 can be a cloud-based server in one embodiment, such as an AMAZON CLOUD SERVER or MICROSOFT AZURE CLOUD, or any other cloud environment, where the functions of server 230 are performed as cloud-based services.

Consumption server 230 can include a data store 240 within which a set of profiles 242 are stored. Profiles 242 include the device profile 124, user profile 126, and consumable profile 128 of FIG. 1, and the like.

As shown, consumption server 230 can include consumption rate tracker 232, order optimization component 234, and an interface module 236. Each of these components 232, 234, and 236 can include circuitry, processors, firmware, and software, as defined herein. Functions of one or more of these components 232, 234, and 236 can be performed in an alternative device (such as consumption device 210, home server 220, marketplace server 260 or delivery server 250) while still being within the contemplated scope of the disclosure.

Consumption rate tracker 232 can track volumetric changes in a consumption device 210 over time to determine an expected rate of change over time (i.e., a consumption rate). This calculated consumption rate can be used to predict a time (or time range) that the supply of consumable product will be exhausted and must be ordered. In one embodiment, the tracker 232 can also consider the delta between the current volume of consumable product within the consumption device 210 and quantity of consumable product being repurchased. For example, the consumption device 210 may hold fifty (50) K-CUPS within its volumetric region, where purchases are typically in units of ten, twenty, or thirty K-CUPS at a time.

In another example, a consumption container 210 can store half (½) of a box of cereal; a box can be the purchasable unit of the consumable product (cereal). Thus, a user may be prompted (i.e., a text message or an email) to "refill" the consumption device 210, until/unless the user indicates that no additional consumable product exists (i.e., the box of cereal is empty). At this point, a "repurchase" mode can be enabled, where previously a fill mode was enabled.

In another embodiment, user prompting can be unnecessary, and the consumption server 230 can "remember" an amount of product previously ordered and can assume a quantity of additional fill remains within the container 210, should any exist. In other contemplated embodiments, the replenishment receptacle 215 can store a reserve inventory of the consumable product and can communicate with the consumption container 210 and/or the consumption server 230 to more accurately assess this relationship between additional fill options (prior to auto-purchase).

For example, in one embodiment, after filling the consumption device 210, the box of cereal can be placed in the replenishment receptacle 215 that provides the consumption server 230 with the weight of reserve cereal. The consumption server 230 can enable a fill-mode for the consumption device 210 is until the replenishment receptacle 215 indicates that the box is relatively empty.

The order optimization component 234 can optimize the order submitted to the marketplace server 260 to lower the overall cost while adhering to the user's repurchasing parameters. For example, different marketplace servers 260 (suppliers or vendors) can have different unit costs for the consumable product, provide volume discounts, offer different shipping options, and the like. Different delivery services (from one or more delivery servers 250) can also have different price points for different regions/addresses/consumable products. The order optimization component 234 can utilize the user's preferences/priorities expressed in their profile 242 to optimize the order. That is, the overall cost for the order can be minimized in accordance with the user's preferences/priorities.

The interface module 236 can be a module enabling a user to interface with the consumption server. This can be a Web server interface, an application interface (API), or any of a variety of other interfaces.

As used herein, presented data stores 240, 265, and 275 can be a physical or virtual storage space configured to store digital information. Data stores 240, 265, and 275 can be physically implemented within any type of hardware including, but not limited to, a magnetic disk, an optical disk, a semiconductor memory, a digitally encoded plastic memory, a holographic memory, or any other recording medium. Data stores 240, 265, and 275 can be a stand-alone storage unit as well as a storage unit formed from a plurality of physical devices. Additionally, information can be stored within data stores 240, 265, and 275 in a variety of manners. For example, information can be stored within a database structure or can be stored within one or more files of a file storage system, where each file may or may not be indexed for information searching purposes. Further, data stores 240, 265, and 275 can utilize one or more encryption mechanisms to protect stored information from unauthorized access.

Networks 202 and 204 can include any hardware/software/and firmware necessary to convey data encoded within carrier waves. Data can be contained within analog or digital signals and conveyed though data or voice channels. Networks 202 and 204 can include local components and data pathways necessary for communications to be exchanged among computing device components and between integrated device components and peripheral devices. Networks 202 and 204 can also include network equipment, such as routers, data lines, hubs, and intermediary servers which together form a data network, such as the Internet. Networks 202 and 204 can also include circuit-based communication components and mobile communication components, such as telephony switches, modems, cellular communication towers, and the like. Networks 202 and 204 can include line based and/or wireless communication pathways.

Figure 3:
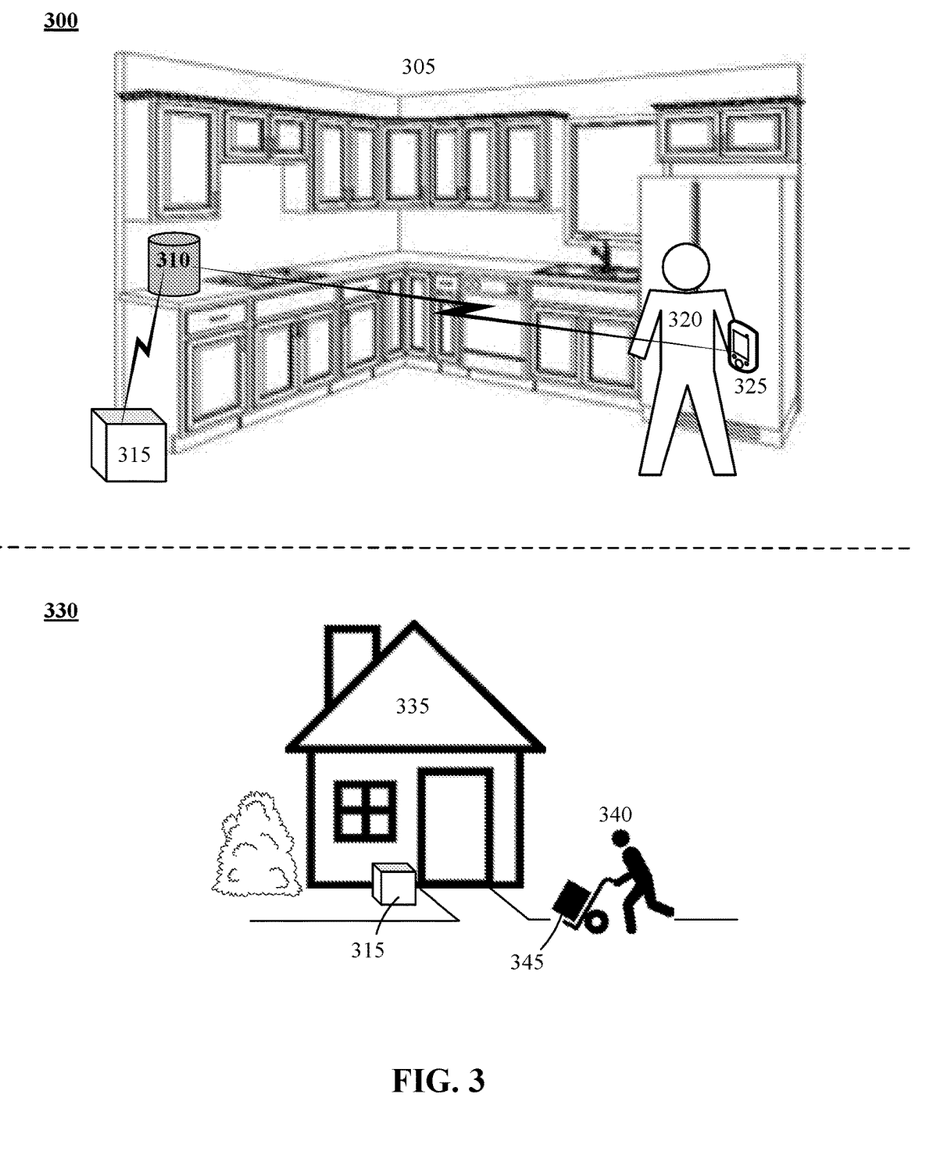
FIG. 3 is a collection of illustrations that describe the use of the replenishment receptacle in accordance with embodiments of the inventive arrangements disclosed herein.

FIG. 3 is a collection of illustrations 300 and 330 that describe the use of the replenishment receptacle in accordance with embodiments of the inventive arrangements disclosed herein. The actions shown in illustrations 300 and 330 can be performed within the context of systems 100 and/or 200.

Illustration 300 can show a typical kitchen 305 setting where a consumption device 310 and a replenishment receptacle 315 are in use. The consumption device 310 can sit on a counter where it dispenses the contained consumable. The replenishment receptacle 315 can be situated nearby such as on the floor at the side of the cabinets. The consumption device 310 and replenishment receptacle 315 can communicate status information with each other. That is, the consumption device 310 can know via these messages that the replenishment receptacle 315 is within the kitchen 305.

When the amount of consumables in the consumption device 310 is reaching a predefined threshold, the consumption device 310 or the consumption server can notify the user 320 via their electronic device 325 that replenishment needs to occur. While the consumption server automatically places the replenishment order, the user 320 can be required to physically relocate the replenishment receptacle 315 to allow access by delivery personnel 340, as shown in illustration 330.

In one embodiment, no consumption device 310 is necessary and communications with electronic device 325 are not necessary. Instead, sensors in the replacement receptacle 315 determine quantities of goods contained therein. This information is periodically reported to a server. Components of the container 315 are placed in a low-power or sleep cycle during reporting to ensure that any included batteries are conserved. The receptacle 315 may have a subscription "ending" option, such as a removable tab, which when removed will end a subscription service. In another embodiment, a user can change subscription terms via an electronic device, such as through a computer accessing a Web site of a manufacture of a receptacle 315 (cCPG) linked good.

In illustration 330, the replenishment receptacle 315 can be placed in front of the user's 320 house 335 (i.e., on a porch). A plug-able hub (connected near the door into an outlet) may detect a presence/movement of the receptacle 315 to a pick-up/delivery location. In another embodiment, a distance between the replenishment receptacle 315 can be such that the consumption device 310 in the kitchen 305 can detect that the replenishment receptacle 315 has been physically relocated (i.e., the replenishment receptacle 315 is outside the range of communicating with the consumption device 310). Other "smart-home" technologies, hubs, appliances, are able to be integrated into the detection network. Regardless of specifics, placement of the receptacle 315 for "pick-up" or "delivery" can trigger a re-ordering or resupply action. In one embodiment, the replenishment receptacle 315 can be made of a durable material capable of withstanding light weather and protecting its internal electronic circuitry. The replenishment receptacle 315 can be purposefully plain so as to not advertise that ordered goods 345 are present, though some branding for the consumption system is contemplated. Such an embodiment assumes that the receptacle 315 is re-used. In another embodiment, the replenishment receptacle 315 (designed for re-use) can include a security mechanism like a keypad lock that the delivery personnel 340 are provided when the replenishment order is placed.

In another embodiment, the receptacle 315 measures quantities of goods, but is itself disposable. For example, additive manufacturing technologies are able to build necessary circuitry into a disposable receptacle in a low-cost manner. Electronics used within the disposable containers are designed to minimize the PCB size, component count, and component cost to minimize the overall bill of materials (BOM). Automation is also heavily leveraged for disposable packages to minimize cost. For example, a BLE chip and coin cell battery may be installed on one of the sensor boards, which electronically connects to the opposing board. Resulting in two boards, automatically assembled, automatically installed into the packaging, and automatically connected. A similar approach could work for a variety of sensors.

Once a disposable cCPG is used, the receptacle is simply discarded. Reordering occurs when the receptacle reaches a threshold at which resupply is necessary based on the consumption rate/trajectory measurements calculated by the cloud-based algorithm, which triggers a resupply and reorder message. In disposable embodiments, the circuitry of the receptacle 315 may be a flex circuit, or printable electronic (PE). In addition to using traditional Printed Circuit Boards (PCBs) with discrete and active components, inks that can conduct electricity—made from materials such as graphite, silver, and copper—are printed on a substrate at high enough density to form a complete electronic circuit, but thin enough to have negligible impact on the substrate thickness. The substrate can be rigid, flexible or even stretchable, such as paper, plastic, fabric or glass. These inks can be applied through traditional printing processes through fast and inexpensive automated processes, such as those used in the commercial printing industry for newspapers and magazines. Components can also be embedded though additive manufacturing processes, such as 3D printing or in-mold electronics. A related field involves conductive yarns which can be woven into fabric to create smart garments. PE can be used to create discreet components such as displays, conductors, transistors, sensors, light emitting diodes, photovoltaic energy capture cells, memory, logic processing, system clocks, antennas, batteries, and low-voltage electronic interconnects. These can be integrated into simple systems that, for example, can record, store, and then transmit temperature information. Fully functional electronic systems can be created in this way, or discreet components and sub-systems can be produced to function as part of a hybrid solution with conventional silicon-based integrated circuits or components. Compared to traditional silicon, PE components are lighter, thinner, cheaper to manufacture and capable of being flexible or even stretchable. As an additive technology, they can be produced without the capital-intensive manufacturing processes typical of silicon that are often wasteful and environmentally harmful. With PE, electronics can be embedded into printed 3D devices and components. We can enable a new generation of wearable healthcare technologies, smart fabrics, flexible electronics, connected homes that conserve energy and even smart packaging that can reduce food and packaging waste. Application Specific Integrated Circuits (ASICs) can also be used as means to reduce the number of off-the-shelf components needed for the cCPG container. In one embodiment, the receptacle 315 can utilize organic photovoltaics (OPV) structures. OPV cells use conductive organic polymers or small organic molecules for light absorption and charge transport to produce electricity from sunlight by the same photovoltaic effect used by conventional solar cells. This technology is another example of the switch from silicon to carbon-based electronics, with the resulting benefits of low cost, high production volume and significant environmental benefits. These flexible solar cells based on thin films can potentially be incorporated into a variety of materials—from window blinds to glass and roofing materials. A building's entire exterior could be turned into a power generator, in a far more flexible and cost-effective way than is possible with conventional inorganic solar cells. Solar cells (of the receptacle 315) can charge an internal battery and/or otherwise provide power needed for the embedded circuitry of receptacle 315. In addition to energy harvesting applications for residential and commercial buildings, OPV also has applications in automotive, point-of-sale and advertising, apparel and consumer electronics. New high sensitivity OPVs are contemplated for the receptacle 315 that is able to harvest ambient light for low-power applications such as self-powered sensors and self-powered antennas. In short, any of a variety of technologies are able to be utilized, with the end goal of minimizing cost for the cCPG.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A consumption system comprising:
a network-enabled replenishment receptacle comprising a wireless transceiver, a sensor, a processor, and a power source, said network-enabled replenishment receptacle having a volumetric region for a consumable product, wherein the network-enabled replenishment receptacle is shipped to a consumer delivery location specified by a consumer, wherein the processor triggers the sensor to measure quantities of consumer goods contained in the volumetric region and to convey a message of the measured quantities via the wireless transceiver;
a remotely-located consumption server configured to, upon the replenishment receptacle having reached a predefined volumetric region threshold such that the measured quantities is less than the predefined volumetric region threshold, effectuate an automatic repurchasing of the consumable product from a vendor for delivery to the consumer delivery location; and
a network-enabled consumption device having a device volumetric region for storing a consumable product and a means for determining a relative level of volume empty versus not empty within the device volumetric region, wherein a consumer is associated with the consumption device, wherein a second predefined volumetric region threshold is compared against a sum of the volume determined from the device volumetric region and a volume present in the replenishment receptacle, wherein when the sum is less than the second predefined volumetric region threshold, an automatic repurchasing of the consumable product from a vendor for delivery to the consumer delivery location.

2. The consumption system of claim 1, wherein the replenishment receptacle further comprises:
programmatic instructions stored in a non-transitory storage medium;
an electromagnetic (EM) emitter array for emitting a plurality of beams; and
an electromagnetic (EM) sensor array for detecting emissions of the plurality of beams, wherein the plurality of beams are distributed within different non-overlapping portions of the volumetric region, wherein one emitter of the EM emitter array corresponds to one sensor of the EM sensor array in a one-to-one fashion, wherein the processor executing a portion of the programmatic instructions determines a volumetric level of consumable products within the volumetric region based on a quantity of uninterrupted beams and a quantity of interrupted beams are emitted by the EM emitter array and received by corresponding ones of the EM sensor array.

3. The consumption system of claim 1, wherein the replenishment receptacle further comprises:
a user profile for storing data about the consumer of the replenishment receptacle, wherein the consumer delivery location for the replenishment receptacle in stored within the user profile.

4. The consumption system of claim 1, wherein the wireless transceiver, the processor, and the sensor of the replenishment receptacle are contained within a separate module that is able to be coupled and decoupled from a container portion of the replenishment receptacle, wherein the separate module is reused.

5. The consumption system of claim 1, wherein the replenishment receptacle further comprises:
a locking mechanism for securing access to the volumetric region of the replenishment receptacle.

* * * * *